(12) United States Patent
Schulte-Sasse

(10) Patent No.: US 10,428,944 B2
(45) Date of Patent: Oct. 1, 2019

(54) COMPRESSION PISTON RING

(71) Applicant: FEDERAL-MOGUL BURSCHEID GmbH, Burscheid (DE)

(72) Inventor: Thomas Schulte-Sasse, Wermelskirchen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 15/742,356

(22) PCT Filed: Jun. 22, 2016

(86) PCT No.: PCT/DE2016/100282
§ 371 (c)(1),
(2) Date: Jan. 5, 2018

(87) PCT Pub. No.: WO2017/016537
PCT Pub. Date: Feb. 2, 2017

(65) Prior Publication Data
US 2018/0216734 A1 Aug. 2, 2018

(30) Foreign Application Priority Data
Jul. 24, 2015 (DE) .................. 10 2015 009 587

(51) Int. Cl.
*F16J 9/26* (2006.01)
*F16J 9/20* (2006.01)

(52) U.S. Cl.
CPC .. *F16J 9/20* (2013.01); *F16J 9/26* (2013.01)

(58) Field of Classification Search
CPC ..................... F16J 9/20; F16J 9/26
See application file for complete search history.

(56) References Cited

U.S. PATENT DOCUMENTS

| | | | |
|---|---|---|---|
| 9,851,006 B2 * | 12/2017 | Watanabe | F16J 9/20 |
| 2004/0012153 A1 | 1/2004 | Yoshida et al. | |
| 2010/0019458 A1 | 1/2010 | Esser et al. | |
| 2010/0162987 A1 | 7/2010 | Ishida | |
| 2012/0205876 A1 * | 8/2012 | Fujimura | F16J 9/20 |
| | | | 277/442 |
| 2012/0319357 A1 | 12/2012 | Barenreuter et al. | |
| 2013/0187340 A1 | 7/2013 | Esser et al. | |
| 2013/0307221 A1 | 11/2013 | Esser | |

(Continued)

FOREIGN PATENT DOCUMENTS

| | | |
|---|---|---|
| CN | 101403348 A | 4/2009 |
| CN | 101761416 A | 6/2010 |

(Continued)

*Primary Examiner* — Gilbert Y Lee
(74) *Attorney, Agent, or Firm* — Norris McLaughlin, P.A.

(57) ABSTRACT

The running face of a compression piston ring also having an inner circumferential surface, and upper and lower flank surfaces interposed between the running face and the inner circumferential surface is provided, in a region thereof adjacent the lower flank, with a first taper of less than 30', having an axial height of 10 to 30%, based on the total running face height (H), the first taper transitioning into a second taper extending in the direction toward the upper flank surface, which is between 90' and 200', and the running face is also provided with a thin wear-resistant layer having a thickness from 0.1 to less than 20 μm, and in particular 4 to 6 μm.

6 Claims, 1 Drawing Sheet

(56) References Cited

U.S. PATENT DOCUMENTS

| | | | |
|---|---|---|---|
| 2014/0008874 A1 | 1/2014 | Esser | |
| 2015/0198249 A1* | 7/2015 | Watanabe | F16J 9/20 277/434 |
| 2017/0175893 A1* | 6/2017 | Fujita | F02F 5/00 |
| 2017/0335965 A1* | 11/2017 | Fujimura | C23C 14/0641 |
| 2018/0038483 A1* | 2/2018 | Shimizu | F16J 9/06 |
| 2018/0195612 A1* | 7/2018 | Krus | C22C 9/06 |

FOREIGN PATENT DOCUMENTS

| | | |
|---|---|---|
| CN | 102770235 A | 11/2012 |
| CN | 103119343 A | 5/2013 |
| CN | 103348166 A | 10/2013 |
| CN | 103384787 A | 11/2013 |
| DE | 3428007 A1 | 2/1986 |
| DE | 1413806 A | 4/2004 |
| DE | 102007007961 A1 | 8/2008 |
| DE | 2206909 A | 7/2010 |
| DE | 102012013803 A1 | 10/2013 |
| JP | S5085603 U | 7/1975 |
| JP | 2002-323133 A | 11/2002 |

\* cited by examiner

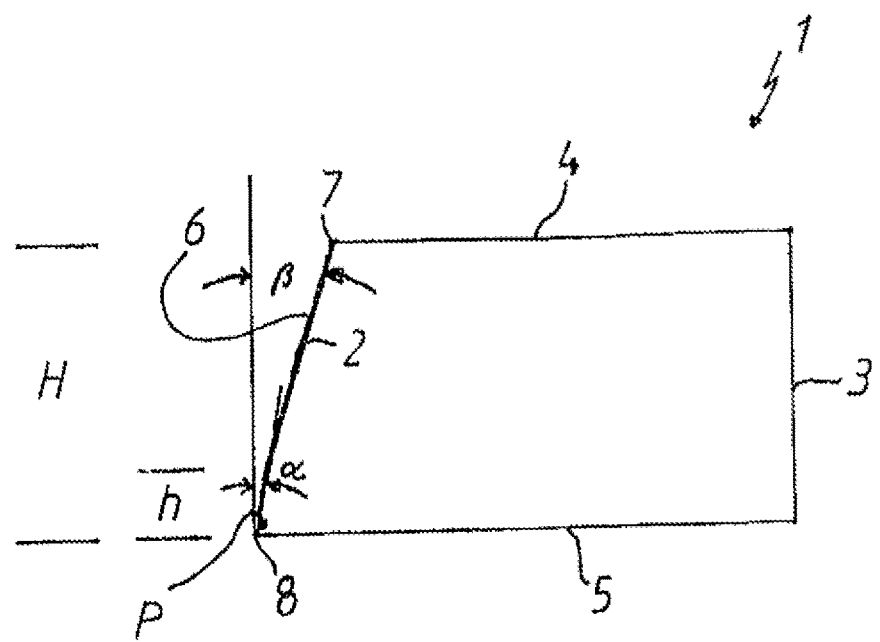

COMPRESSION PISTON RING

BACKGROUND OF THE INVENTION

The invention relates to a compression piston ring.

EP 2 206 909 A1 discloses a piston device for internal combustion engines, comprising a first and a second compression ring, wherein the second compression ring has a notch on the slot side. The running face may have a conical design.

A steel piston ring is disclosed in EP 1 413 806 A1, comprising a running face having a varying geometry contour, an inner circumferential surface, and an upper and a lower flank surface. The rounded transition region from the running face to the lower flank surface is provided with a recess having an approximately square or rounded contour.

It is known in general to provide upper and lower edges at the running faces, or rounded edges, on chrome-plated piston rings, which can prevent chipping of the wear-resistant layers.

SUMMARY OF THE INVENTION

It is the object of the invention to provide a compression piston ring that has a predefinable running face geometry, wherein no chipping is to occur in the transition regions between the running face and the flank surfaces, regardless of the applied wear-resistant layer. It should be possible to dispense with the introduction of edges at the running faces.

BRIEF DESCRIPTION OF THE DRAWING

The drawing is a schematic representation of an axial cross-section of a compression ring according to the invention.

DETAILED DESCRIPTION OF THE INVENTION

The object is achieved by a compression piston ring, comprising a running face, an inner circumferential surface, and upper and lower flank surfaces interposed therebetween, wherein a slight taper of less than 30' having an axial height of 10 to 30%, based on the total running face height, is provided on the running face in a region thereof adjacent the lower flank surface, the slight taper transitioning into a taper extending in the direction of the upper flank surface which is between 90' and 200', and wherein a thin wear-resistant layer having a thickness from 0.1 to less than 20 µm, and in particular 4 to 6 µm, is deposited on the entire running face.

While the taper has an angle β of between 90' and 200', the slight taper has an angle α that is less than or equal to 20'. The slight taper advantageously extends across an axial height of 10 to 30% of the entire running face of the compression piston ring.

The thickness of the wear-resistant (thin) layer, according to a further idea of the invention, is between 0.1 µm and less than 20 µm. Preferred layer thicknesses are in a range between 4 µm and 6 µm.

In addition to chromium layers, PVD (physical vapor deposition), CVD (chemical vapor deposition) and/or DLC (diamond-like coating) layers may be used as wear-resistant layers. All coating types have in common that they can be generated by way of thin-film technology.

The slight taper integrally formed on the running face in the region of the lower flank surface is provided for improved light gap characteristics.

The running face of the compression piston ring should preferably be provided with a chromium layer less than 10 µm thick.

As addressed above, chromium layers cause indentations when deposited in the transition regions between the flank surfaces and the running face. To be able to contain these, edges extending in the radial direction were integrally previously formed on the running faces in these transition regions, into which the chromium layer then extends.

Since the subject matter of the invention eliminates the need for such edges, the overall height of the piston ring can be further reduced.

It is furthermore advantageous that the transition regions between the upper/lower flank surface and the running face of the wear-resistant layer are designed to be slightly rounded, in particular by way of brushing.

The subject matter of the invention likewise makes it possible to position the pivot point position as close to the lower edge of the running face as possible, whereby oil consumption can be better controlled.

The subject matter of the invention is shown in the drawing based on an exemplary embodiment and is described as follows.

The FIGURE shows a compression piston ring 1, comprising a running face 2, an inner circumferential surface 3, an upper flank surface 4, and a lower flank surface 5. The conically designed running face 2 includes a slight taper α, which starts in the region of the lower flank 5 and ends in a taper β extending in the direction of the upper flank surface 4. For the sake of better clarity, the tapers α, β are shown exaggerated.

The slight taper α has a height h of approximately 15% of the total height H of the compression piston ring 1. When the compression piston ring 1 is installed, the slight taper α provides improved light gap characteristics. In the present example, the compression piston ring 1 shall be designed as a cast ring or steel ring, wherein cast steel piston rings are also conceivable, of course.

In the present example, the slight taper α shall be approximately 20', while the taper in this example shall be 150'. The running face 2 is provided with a wear-resistant thin layer 6 across the entire height H thereof. In the present example, the wear-resistant layer 6 shall be designed as a chromium layer having a layer thickness of 8 µm. If needed, the wear-resistant layer 6 may be rounded in the transition regions 7, 8 from the upper flank surface 4 into the running face, and from the lower flank surface 5 into the running face 2. This can be done by way of brushing or the like, if necessary.

The subject matter of the invention creates a running face conicity that is adapted to the respective twist angle of the compression piston ring 1, whereby a uniform pivot point position across the entire circumference is achieved. The pivot point position decisively controls the functional behavior of a piston ring in the engine. On the compression piston ring 1, the pivot point P is to be provided on the running face side in the region of the lower flank surface 5.

The compression piston ring of the present invention is suitable for use as a second compression piston ring for a piston of an internal combustion engine.

The invention claimed is:

1. A compression piston ring, comprising a running face, an inner circumferential surface, and upper and lower flank surfaces interposed therebetween, wherein a first taper (α) less than 30' having an axial height (h) of 10 to 30%, based on the total running face height (H), is provided on the running face in a region thereof adjacent the lower flank surface, the first taper transitioning into a second taper (β) extending in a direction toward the upper flank surface and which is between 90' and 200', and wherein a wear-resistant layer having a thickness from 0.1 to less than 20 μm is provided on the entire running face.

2. The compression piston ring according to claim 1, wherein the wear-resistant layer is a Cr, PVD, CVD or DLC layer.

3. The compression piston ring according to claim 1, wherein respective rounded transition regions of the wear-resistant layer where the running face transitions to the respective upper and lower flank surfaces are provided.

4. The compression ring according to claim 3, wherein the rounded transition regions have been formed by brushing.

5. The compression ring according to claim 1, wherein the thickness of the wear-resistant layer is 4 to 6 μm.

6. A piston of an internal combustion engine provided with a first compression ring and the compression piston ring according to claim 1 as a second compression.

* * * * *